US007418532B2

(12) United States Patent  
Suzuki et al.

(10) Patent No.: US 7,418,532 B2  
(45) Date of Patent: Aug. 26, 2008

(54) DATA TRANSFER DEVICE, DATA TRANSFER SYSTEM, AND DATA TRANSFER METHOD

(75) Inventors: Tatsuo Suzuki, Kyoto (JP); Akihiro Hatsusegawa, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 76 days.

(21) Appl. No.: 10/266,923

(22) Filed: Oct. 9, 2002

(65) Prior Publication Data

US 2003/0110332 A1  Jun. 12, 2003

(30) Foreign Application Priority Data

Oct. 9, 2001 (JP) ............................. 2001-311758

(51) Int. Cl.
 *G06F 3/00* (2006.01)
 *G06F 13/00* (2006.01)
(52) U.S. Cl. ............................. 710/60; 710/29; 710/36; 709/233; 714/708; 375/225
(58) Field of Classification Search .................. 710/58, 710/60; 365/195
 See application file for complete search history.

(56) References Cited

U.S. PATENT DOCUMENTS

| 4,914,618 | A | * | 4/1990 | Dodge ........................ 713/600 |
| 5,081,575 | A |   | 1/1992 | Hiller et al. |
| 5,268,906 | A | * | 12/1993 | Free .......................... 714/708 |
| 5,438,671 | A |   | 8/1995 | Miles |
| 5,668,841 | A | * | 9/1997 | Haskell et al. ............... 375/371 |
| 5,675,726 | A |   | 10/1997 | Hohenstein et al. |
| 5,724,514 | A | * | 3/1998 | Arias ........................ 709/235 |
| 5,999,995 | A | * | 12/1999 | Ueno et al. .................. 710/60 |
| 6,009,131 | A | * | 12/1999 | Hiramatsu ................... 375/354 |

(Continued)

FOREIGN PATENT DOCUMENTS

CN   1258173 A   6/2000

(Continued)

OTHER PUBLICATIONS

The Transmission Control Protocol; http//condor.depaul.edu/~jkristof/echnotes/tcp.html (source coude indicates last updated Apr. 24, 2004).*

*Primary Examiner*—Tanh Q Nguyen  
(74) *Attorney, Agent, or Firm*—McDermott Will & Emery LLP (57) ABSTRACT

A transfer start/end detecting section detects timing at which a DMARQ signal becomes an H level or an L level. A transfer time-measuring section measures a transfer time during which data transfer is actually performed within a period in which a predetermined number of data blocks are transferred. A transfer byte count-measuring section measures a transferred byte count of data that have successfully been transferred. An effective data transfer rate-computing section computes an effective data transfer rate by dividing the transferred byte count by the transfer time. A transfer rate-comparing section compares the effective data transfer rate with a transfer rate that is one step slower than a current transfer rate output from a selectable transfer rate-storing section. If the former is slower, a transfer rate-switching section switches to the transfer rate that is one step slower. A large decrease in the effective data transfer rate caused by data corruption is prevented.

8 Claims, 4 Drawing Sheets

U.S. PATENT DOCUMENTS

| | | | |
|---|---|---|---|
| 6,035,425 A * | 3/2000 | Caldwell et al. ............... | 714/52 |
| 6,209,046 B1 | 3/2001 | Sato et al. | |
| 6,340,973 B1 | 1/2002 | Ochiai et al. | |
| 6,772,245 B1 * | 8/2004 | Pomerantz et al. ............ | 710/60 |

FOREIGN PATENT DOCUMENTS

| | | |
|---|---|---|
| EP | 0 994 422 A2 | 4/2000 |
| JP | 63-153635 | 6/1988 |
| JP | 08-194602 | 7/1996 |
| JP | 11-045157 | 2/1999 |
| JP | 2001-236182 A | 8/2001 |

* cited by examiner

DATA TRANSFER DEVICE, DATA TRANSFER SYSTEM, AND DATA TRANSFER METHOD

BACKGROUND OF THE INVENTION

The present invention relates to data transfer for writing data and read data between a host computer and an optical disk device or the like, and more particularly, to data transfer devices in the host computer and the optical disk device or the like. The invention also relates to a data transfer system performing data transfer between these devices, and data transfer methods.

Conventionally, IDE bus (ATA/ATAPI interface standard) has frequently been used for connecting between the main unit of a personal computer, which serves as a host computer, and peripheral devices, such as optical disk devices or the like, for example, a DVD-ROM drive and a CD-R/RW drive, and Ultra DMA has been used for the protocol. In the standard of the Ultra DMA, previously-known transfer modes 0 to 2 have been enhanced to transfer modes 3 and 4, enabling data to be transferred at a transfer rate of 16.77 to 66.7 Mbytes/sec. The standards for transfer modes 5 and 6 (100, 133 Mbytes/sec) are also under development.

The above-described transfer modes have upward compatibility, and the device with a higher transfer mode can select a plurality of transfer rates so that when a partner device has a lower transfer mode, the device with the higher transfer mode can perform transfer at the highest possible rate that the partner device can manage. In other words, the transfer rate between two devices is uniquely decided according to the transfer modes of the two devices.

Generally, when a data transfer rate is higher, data corruption is more likely to occur because of subtle mismatching in bus timing or the like. Even when this happens, it is possible to perform the data transfer successfully by repeatedly transfer the same data; however, the effective data transfer rate decreases according to the number of times the data transfer is repeated.

As mentioned above, in conventional data transfer devices, the data transfer rate between transfer devices is uniquely selected according to the transfer modes of the transfer devices, but the possibility of data corruption is not taken into consideration. It has been found that the selected transfer rate, therefore, does not necessarily produce the optimum effective data transfer rate.

More specifically, according to a trial carried out by the present inventors, data corruption occurred relatively frequently in, for example, a personal computer having a CD-R/RW drive and a DVD-ROM drive connected thereto, when the DVD-ROM drive read out data and transferred them to the personal computer while the CD-R/RW drive was performing a writing operation into a storage medium from the buffer therein in which data have been transferred. When measuring the effective data transfer rate, it was revealed that the transfer rate was sometimes reduced to a transfer rate that is one step slower. It has been common that the data corruption as described above is dealt with by improvement in transfer lines, setting of signal processing timing, or the like. For this reason, decreases in effective data transfer rates have not been perceived as a problem.

SUMMARY OF THE INVENTION

In view of the foregoing and other problems, it is an object of the present invention to easily prevent a large decrease in effective data transfer rate caused by data corruption.

This and other objects are accomplished in accordance with the present invention by providing a data transfer device performing data transfer with another device, comprising: a transfer rate-detecting means for detecting an effective data transfer rate; and a transfer rate-controlling means for controlling a data transfer rate according to the result of the detection performed by the transfer rate-detecting means.

In this device, an effective data transfer rate is detected by the transfer rate-detecting means, and according to the result, the data transfer rate of the device is controlled. Thus, in such cases that data corruption occurs at high data transfer rates, the data transfer rate can be controlled to, for example, a data transfer rate that is one step slower, and consequently, a large decrease in the data transfer rate can be prevented. In particular, even when it is difficult to suppress data corruption by improving transfer lines or setting signal processing timing or the like, a large decrease in the data transfer rate can be easily prevented without increasing manufacturing cost greatly. It should be noted that the effective data transfer rate herein is not limited to straightforward numerical values, such as transferred byte counts per unit time, and various converted values by which a substantially equivalent judgment is possible may be used, such as the ratio between the byte count or the block count of the data that have been transferred successfully and the byte count or the block count of the data that have not been transferred successfully, the ratio between either one of the foregoing bite or block counts and the byte or block count of all the transferred data, and so forth.

Preferably, the above-described data transfer device may further comprise a sending means for sending transfer data at the data transfer rate controlled by the transfer rate-controlling means, and in the data transfer device, the transfer rate-detecting means detects the effective data transfer rate based on information received from a receiving device that receives the transfer data, the information comprising at least one of information indicating whether the transfer has succeeded or failed and information used for judging whether the transfer has succeeded or failed.

The information indicating whether the transfer has succeeded or failed and the information used for judging whether the transfer has succeeded or failed may comprise information acknowledging that a predetermined unit amount of data blocks have been received successfully by the receiving device, information indicating the amount of data that have been received successfully, information indicating the amount of data that have not been received successfully, and information obtained from received data that have been subjected to a predetermined computation for detecting an error.

With the above-described device, the effective data transfer rate can be easily detected according to the information whether the transfer has succeeded or failed or the information used for judging whether the transfer has succeeded or failed.

Preferably, in the above-described data transfer device, the sending means outputs, in addition to the transfer data, a timing signal indicating timing for letting the receiving device receive the transfer data; and the transfer rate-controlling means controls timing for outputting the transfer data and the timing signal.

With the above-described device, the data transfer rate can be easily controlled by controlling output timing of a timing signal such as a strobe signal and a clock signal. In addition, because transferred data are output along with the timing signal, the receiving side device does not require consideration of the effects caused by the controlling of the data transfer rate. Therefore, the receiving side device does not need to have a function different from conventional devices, and thus it is easy to maintain compatibility with conventional devices.

The above-described data transfer device may further comprise a receiving means for receiving transferred data, and in the data transfer device, the receiving means outputs a timing signal indicating timing for letting a sending device for sending the transferred data send the transferred data; and the transfer rate-controlling means controls output timing of the timing signal.

With the above-described device, the data transfer rate can be easily controlled as with the previously described device, and the sending side device does not require consideration of the effects caused by the controlling of the data transfer rate. Therefore, compatibility with conventional devices can be easily maintained.

In the above-described data transfer device, it is preferable that the transfer rate-detecting means detects the effective data transfer rate based on a total time in which data transfer has actually been performed and an amount of data that has been transferred successfully.

With the above-described device, the effective data transfer rate can be obtained, for example, without being affected by the time required for the sending and receiving of a control signal or the like. Therefore, the control of appropriate data transfer rates can be easily and reliably performed.

In the above-described data transfer device, it is preferable that the transfer rate-detecting means detects the effective data transfer rate according to a frequency of data transfer in which the data transfer has been performed successfully.

With the above-described device, the effective data transfer rate can be easily detected, for example, without obtaining a total time in which data transfer is performed.

In the above-described data transfer device, it is preferable that the transfer rate-detecting means selects a data transfer rate from a plurality of steps of predetermined data transfer rates.

With the above-described device, the effective data transfer rate can be easily controlled by the selection of data transfer rates.

In the above-described data transfer device, it is preferable that when the effective data transfer rate that has been detected by the transfer rate-detecting means is slower than a transfer rate that is one step slower than a currently-selected data transfer rate, the transfer rate-detecting means selects the data transfer rate that is one step slower.

The above-described device controls the data transfer rate with reference to the data transfer that is one step slower. As a result, it can control the data transfer rate at an appropriate data transfer rate without excessively reducing the data transfer rate.

In the above-described data transfer device, it is also preferable that at predetermined timing, the transfer rate-controlling means selects a data transfer rate that is one step faster than a currently-selected data transfer rate; and if the effective data transfer rate that is detected by the transfer rate-detecting means is slower than the original data transfer rate while the data transfer rate that is one step faster is being selected, then the transfer rate-controlling means reverts the data transfer rate to the original data transfer rate; and if the effective data transfer rate detected by the transfer rate-detecting means is faster than the original data transfer rate, then the transfer rate-controlling means maintains the data transfer rate that is one step faster.

With the above-described device, even when the transfer rate is temporarily set slower, the transfer rate is successively made faster to prevent the transfer rate from being suppressed at an excessively slow rate in such cases where the data corruption occurs only for a moment or the environmental conditions change. Accordingly, it is possible to prevent the transfer rate from being kept at an excessively slow rate.

The present invention also provides data transfer device performing data transfer with a receiving side data transfer device receiving transfer data, comprising: a sending means for sending the transfer data; and a transfer rate-controlling means for controlling a transfer rate of data transfer performed by the sending means according to an instruction made based on an effective data transfer rate detected by the receiving side data transfer device.

With the above-described data transfer device, the data transfer rate is controlled according to the instruction from the receiving side data transfer device, and consequently, a large decrease in the data transfer rate can be prevented in cases where data corruption occurs at high data transfer rates.

Further, the present invention provides a data transfer device performing data transfer with a sending side data transfer device sending transfer data, comprising: a receiving means for receiving the transfer data; a transfer rate-detecting means for detecting an effective data transfer rate of the transfer data that have been received by the receiving means; and a transfer rate-indicating means for indicating a data transfer rate to the sending side data transfer device according to the result of the detection performed by the transfer rate-detecting means.

With the above-described data transfer device, the sending side data transfer device controls the data transfer rate according to the instruction from the transfer rate-indicating means, and consequently, a large decrease in the data transfer rate can be prevented in cases where data corruption occurs at high data transfer rates.

Still further, the present invention provides data transfer system comprising: a sending side data transfer device having a sending means for sending transfer data; and a receiving side data transfer device having a receiving means for receiving the transfer data; wherein at least one of the sending side data transfer device and the receiving side data transfer device comprises: a transfer rate-detecting means for detecting an effective data transfer rate; and a transfer rate-controlling means for controlling a data transfer rate according to the result of the detection performed by the transfer rate-detecting means.

With the above-described data transfer system, the data transfer rate is controlled by the transfer rate-controlling means according to the effective data transfer rate detected by the transfer rate-controlling means, and consequently, a large decrease in the data transfer rate can be prevented in cases where data corruption occurs at high data transfer rates.

In addition, the present invention provides a method of transferring data between a device and another device, comprising the steps of: detecting an effective data transfer rate; and controlling a data transfer rate according to the result obtained in the step of detecting.

In this method of transferring data as well, the data transfer rate is controlled by the step of controlling the transfer rate according to the effective data transfer rate detected in the step of controlling the transfer rate, and consequently, a large decrease in the data transfer rate can be prevented in cases where data corruption occurs at high data transfer rates.

DETAILED DESCRIPTION OF THE INVENTION

Embodiment 1

Hereinbelow, one embodiment of the present invention is described with reference to the drawings, taking as an example a data transfer system in which an optical disk device, which is a data transfer device of the present invention, is connected to a host personal computer. In this example, IDE bus and Ultra DMA protocol, for example, are used for the connection and the data transfer between the host personal computer and the optical disk device, and the maximum data transfer rate for both the host personal computer and the optical disk device is 66.7 Mbytes/sec (Ultra DMA mode 4).

Figure 1:
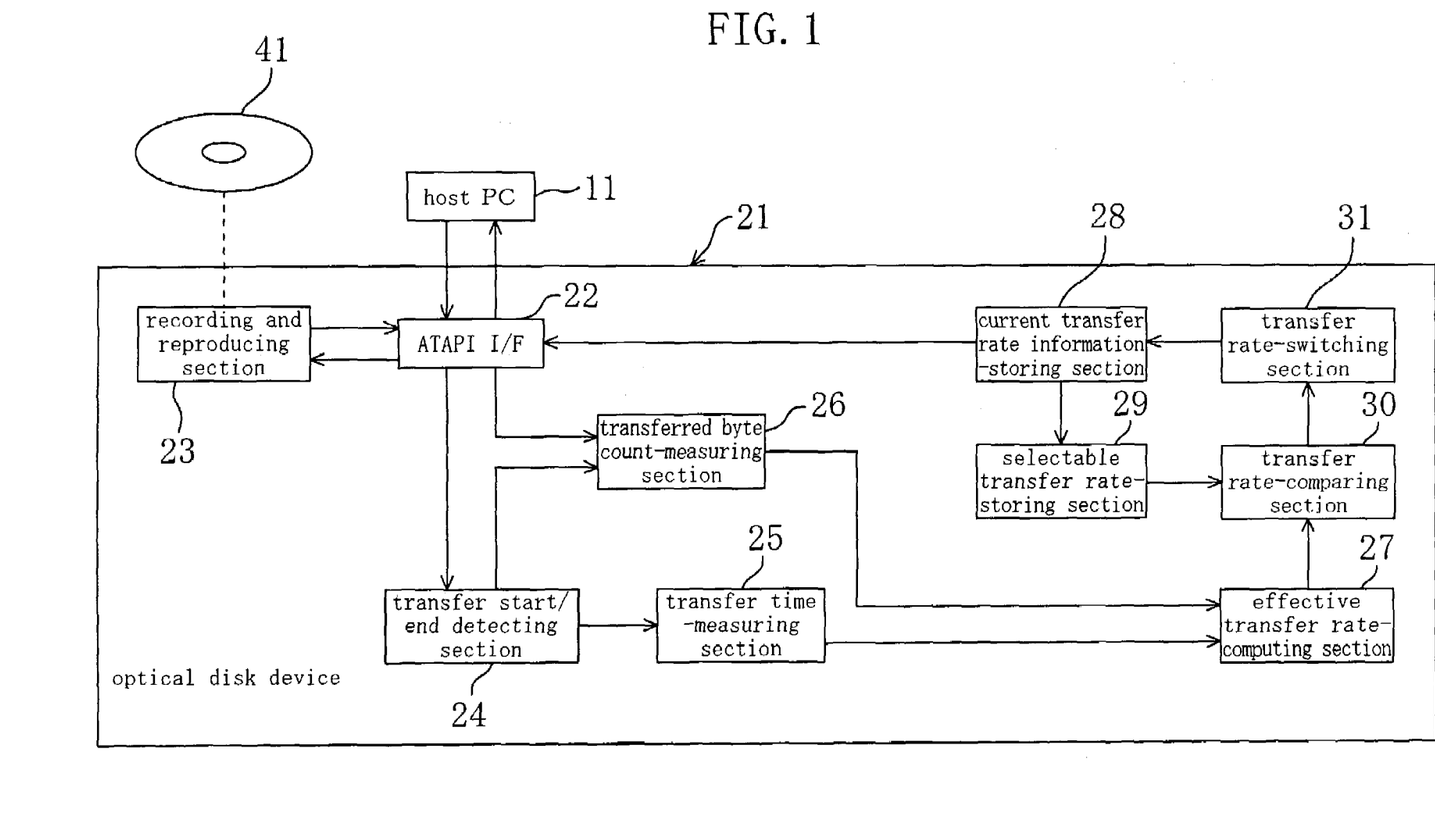
FIG. 1 is a block diagram showing the configuration of principal portions of a data transfer system and an optical disk device according to Embodiment 1 of the present invention.

FIG. 1 depicts the configuration of the principal portion of an optical disk device 21 connected to a host personal computer 11. In the configuration shown in FIG. 1, an ATAPI I/F 22 is for sending and receiving of controls signals and for performing data transfer with the host personal computer 11. Specifically, the data transfer is carried out by outputting a strobe signal and data to be transferred at the timing synchronized with the strobe signal having a frequency corresponding to a transfer rate that is indicated by a current transfer rate information-holding section 28. The current transfer rate information-holding section 28 will be detailed later. Usually, the data transfer is performed each data block by data block, each data block (ECC block) having a predetermined amount of data (for example, 2048×16 bytes), and whether the data are transferred successfully or not is decided by an error detection using CRC (cyclic redundancy check) data that are returned from the host personal computer 11. The result of the decision is notified from an optical disk device 21 to the host personal computer 11. Usually, if the data are not successfully transferred, the host personal computer 11 requests the same data block repeatedly.

A recording and reproducing section 23 performs recording and reproducing of data in a recording medium 41 such as an optical disk. A transfer start/end-detecting section 24 detects the start timing and the end timing of a period during which the data transfer is actually performed. Specifically, it is configured to detect the rises and falls of a DMARQ signal output from the host personal computer 11.

A transfer time-measuring section 25 measures the total time in which data transfer is actually carried out within a predetermined time period, for example, within each several seconds, based on the result of the detection performed by the transfer start/end-detection section 24.

A transferred byte count-measuring section 26 measures the byte count of the data that have been successfully transferred via the ATAPI I/F 22 within the predetermined time period, for which the transfer time-measuring section 25 measures the foregoing total time.

Based on the results of the measurements by the transfer time-measuring section 25 and the transferred byte count-measuring section 26, an effective transfer rate-computing section 27 obtains an effective data transfer rate, that is, a byte count of the data that have been successfully transferred per a time in which data transfer is actually performed. (The transfer start/end detecting section 24, the transfer time-measuring section 25, a transferred byte count-measuring section 26, and the effective transfer rate-computing section 27 together constitute a transfer rate-detecting means.)

A current transfer rate information-holding section 28 holds current transfer rate information indicating the transfer rate that is currently selected (current transfer rate), and based on this information, indicates the transfer rate to the ATAPI I/F 22.

A selectable transfer rate-storing section 29 stores transfer rates that the optical disk device 21 can select (transfer rates that are specified by a standard), and outputs a value indicating the transfer rate that is one step slower than the current transfer rate indicated by the current transfer rate information-holding section 28.

A transfer rate-comparing section 30 compares the transfer rate that is output from the selectable transfer rate-storing section 29 with the effective transfer rate that is obtained by the effective transfer rate-computing section 27.

If the transfer rate-comparing section 30 finds that the effective transfer rate is slower than the transfer rate that is one step slower than the current transfer rate, a transfer rate-switching section 31 (transfer rate-controlling means) changes the current transfer rate information to be held in the current transfer rate information-holding section 28 into information that indicates a transfer rate that is one step slower than the current transfer rate, in order to switch the transfer rate of the data transfer performed by the ATAPI I/F 22. The transfer rate-switching section 31 is also configured to change the transfer rate into a transfer rate that is one step faster than the current transfer rate at predetermined timing in order to prevent the transfer rate from becoming excessively slow.

The following-describes an operation of the data transfer system thus configured in which data stored in the storage media 41 are reproduced and are transferred to the host personal computer 11.

Basic Transfer Operation

Between the host personal computer 11 and the optical disk device 21, signal transmission is carried out via the ATAPI I/F 22 in advance in order to determine data transfer conditions such as a transfer rate or the like. In the example of the present embodiment, both the host personal computer 11 and the optical disk device 21 have a maximum data transfer rate of 66.7 Mbytes/sec, as mentioned previously, and accordingly, the information indicating this maximum transfer rate is set in the current transfer rate information-holding section 28.

Next, a data read request for data stored in the storage medium 41 is made from the host personal computer 11. At the same time, a requested data length (requested data block length) is specified.

Figure 2:
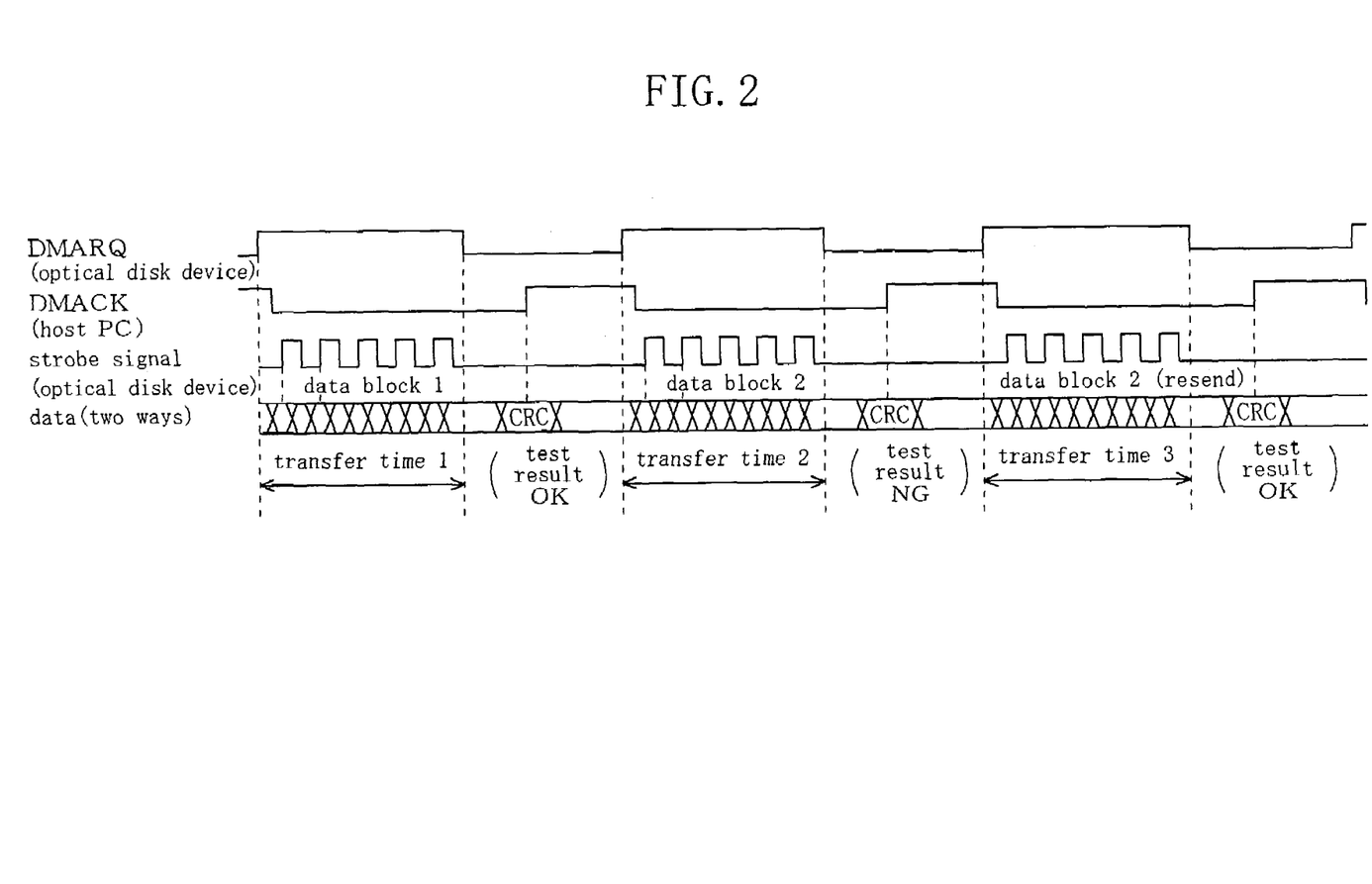
FIG. 2 is a timing chart illustrating examples of the signals that are transferred between the host personal computer and the optical disk device.

Thereafter, as shown in FIG. 2, when the optical disk device 21 becomes ready to begin a transfer of the data reproduced by the recording and reproducing section 23, a transfer start preparation completion-notifying signal (DMARQ signal) that is output from the ATAPI I/F 22 becomes an H level. When a transfer start-requesting signal (DMACK signal) becomes an L level as a result of this, data to be transferred (DATA) are output, as well as a strobe signal having a frequency corresponding to the transfer rate indicated by the current transfer rate information-holding section 28, at the timing synchronized with the strobe signal. Then, when the data for one data block have been transferred, the DMARQ signal becomes an L level and the strobe signal is halted. Next, when the host personal computer 11 sends back CRC data generated from the transferred data and turns the DMACK signal into an H level, the ATAPI I/F 22 compares the received CRC data with CRC data generated by the ATAPI I/F 22 in order to detect errors. The result of the error detection is stored in a predetermined register, which is not shown in the figure, and the content thereof is referred to by the host personal computer 11 in order to determine whether the same data block is to be transferred again or the next data block is to be transferred. Then, the same operation is repeated until all the data requested from the host personal computer 11 have been transferred.

Control of Transfer Rates

When the data transfer as described above is carried out, the transfer start/end detecting section 24 detects the timing at which the DMARQ signal becomes an H level and the timing at which it becomes an L level. Based on the detection, the transfer time-measuring section 25 measures a time in which the DMARQ signal is at an H level, that is, a time in which data transfer is actually performed, within a period during which a predetermined number of data blocks (for example, the number of data blocks that corresponds to a predetermined sector length) are transferred.

Meanwhile, by counting the strobe signal, the transferred byte count-measuring section 26 measures the byte count of transferred data that are successfully transferred within the period during which the predetermined number of data blocks are transferred, that is, the byte count of transferred data other than the data that are resent as a result of the foregoing error detection.

The effective transfer rate-computing section 27 computes an effective data transfer rate by dividing the byte count by the transfer time.

The transfer rate-comparing section 30 compares the effective data transfer rate with the transfer rate that is one step slower than the current transfer rate that is output from the selectable transfer rate-storing section 29. A specific example is as follows. As mentioned above, the information indicating a transfer rate of 66.7 Mbytes/sec is held in the current transfer rate information-holding section 28, for example, at the time of initial transfer; thus, based on the held information, the selectable transfer rate-storing section 29 outputs a value indicating 33 Mbytes/sec that is one step slower, and the output value is then compared with the effective data transfer rate computed by the effective transfer rate-computing section 27.

If it is found as a result of the comparison that the effective data transfer rate is slower than 33.3 Mbytes/sec, the transfer rate-switching section 31 switches the current transfer rate information-holing section 28 so as to hold the information indicating 33.3 Mbytes/sec and the ATAPI I/F 22 performs subsequent data transfer at the switched transfer rate, because it is possible that reducing the frequency of the strobe signal can rather increase the effective data transfer rate. Then, if much data corruption occurs even at the switched transfer rate, then it switches to an even slower transfer rate by a similar operation. More specific explanation is given below with reference to FIG. 2. It is assumed that the detection of transfer rates is performed each time three data blocks are transferred. In this case, if a CRC error occurs at the transfer of the second data block and consequently the data is resent one time, two data blocks have been transferred successfully within the transfer time for three data blocks and the effective data transfer rate is thus 44.4 Mbytes/sec; therefore, the transfer rate is to be maintained at 66.6 Mbytes/sec. If a CRC error occurs two times and the data are resent two times, the effective data transfer rate is 22.2 Mbytes/sec, which is slower than 33.3 Mbytes/sec, the transfer rate that is one step slower; therefore, the transfer rate is switched to 33.3 Mbytes/sec.

The transfer rate-switching section 31 makes the current transfer rate information-holding section 28 hold information indicating the transfer rate that is one step faster (within a range below the maximum transfer rate) at each predetermined timing, for example, each plurality of times the comparison of transfer rates is performed by the transfer rate-comparing section 30, in order to attempt a faster data transfer. Specifically, even when the transfer rate is temporarily set slower, the transfer rate is successively made faster to prevent it from being suppressed at an excessively slow rate, in such cases where the data corruption occurs only for a moment or the environmental conditions change. Here, the frequency of attempting the transfer rate that is one step faster is not limited to that described above; it may be attempted at each time the effective data transfer rate is found to be faster in the comparison performed by the transfer rate-comparing section 30, or may be made variable according to setting specified by a user or the like. It is also possible to reduce the frequency according to a past history, that is, the frequency is reduced as the number of times it is found that the effective data transfer rate does not become faster even if the transfer rate is increased is greater.

When data transfer rates are thus controlled by detecting an effective data transfer rate, an appropriate data transfer rate can be selected in cases where data corruption occurs at fast data transfer rates. Therefore, a large decrease in data transfer rates can be prevented. Moreover, because the transfer is performed in synchronization with a signal that controls timing of the data transfer, such as a strobe signal, a partner side device does not require consideration of the effects caused by the controlling of the data transfer rate. Therefore, the partner side device does not need to have a function different from conventional devices, and thus it is easy to maintain compatibility with conventional devices.

Embodiment 2

Figure 3:
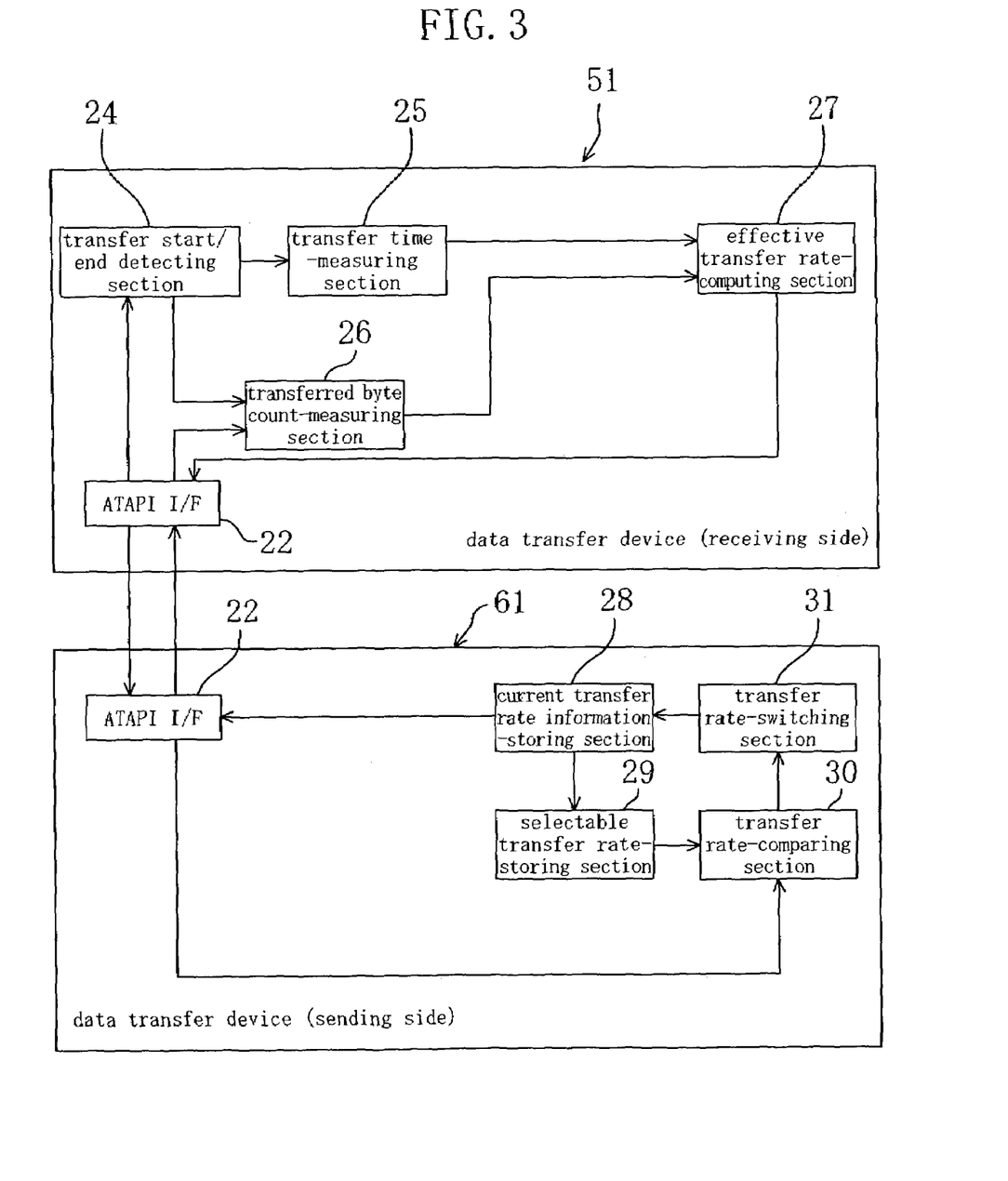
FIG. 3 is a block diagram showing the configuration of principal portions of a data transfer system and an optical disk device according to Embodiment 2 of the present invention.

Referring now to FIG. 3, an example of a data transfer system is described in which a receiving side data transfer device detects an effective data transfer rate and, according to the detected transfer rate, a sending side data transfer device switches transfer rates. In the present embodiment, similar components having similar functions to the components described in the foregoing Embodiment 1 are designated by the same reference numerals, and are not further elaborated upon. It should also be noted that the recording and reproducing section 23 is not shown in FIG. 3 for the sake of brevity in the drawing.

In a data transfer system of Embodiment 2, a receiving side data transfer device 51 has the transfer start/end detecting section 24, the transfer time-measuring section 25, the transferred byte count-measuring section 26, and the effective data transfer rate-computing section 27. An effective data transfer rate is obtained by the effective data transfer rate-computing section 27 in a similar manner to Embodiment 1, and the obtained effective data transfer rate is sent to the transfer rate-comparing section 30 in a sending side data transfer device 61 via the ATAPI I/F 22 (transfer rate-indicating means). The data transfer device 61 is configured to switch data transfer rates based on the effective data transfer rate, in a similar manner to Embodiment 1 described above.

In cases of such a configuration as well, switching of transfer rates similar to that in Embodiment 1 is performed and thereby a large decrease in the effective data transfer rate can be prevented even when data corruption occurs. It should be noted that the above-description is not intended to limit which of the data transfer device 51 or 61 should comprise the above-described components. For example, the effective data transfer rate-computing section 27 may be provided in the data transfer device 61 so that transfer time and transferred byte counts are sent from the data transfer device 51 to the data transfer device 61. In addition, the transfer rate-comparing section 30 may also be provided in the data transfer device 51 so that the result of the comparison, a command that instructs switching of data transfer rates, or the like can be sent to the data transfer device 61. These configurations also achieve similar effects.

Figure 4:
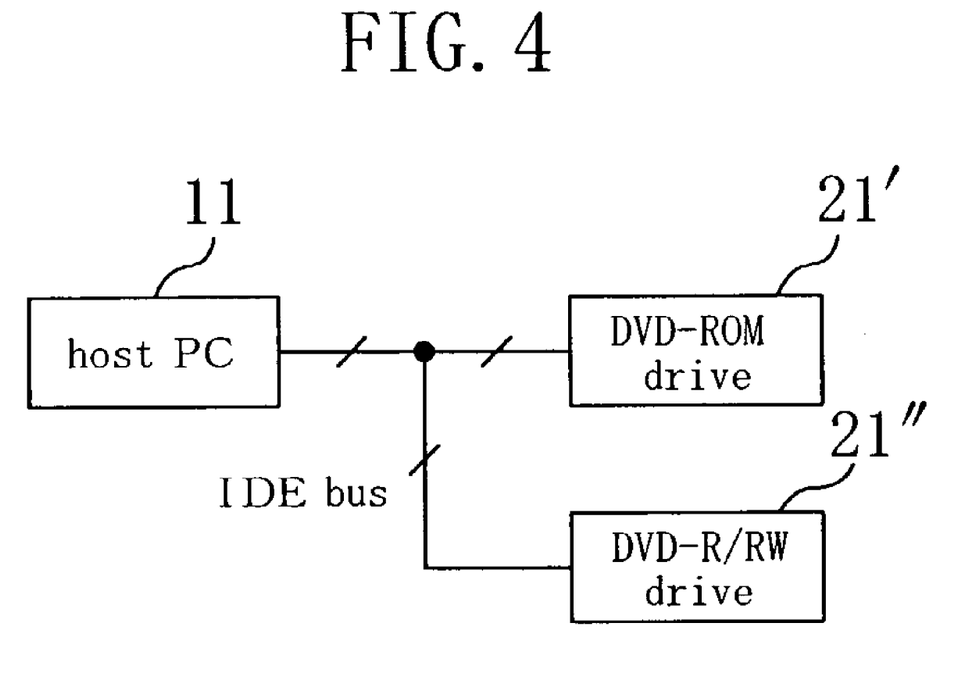
FIG. 4 is a block diagram showing another example of a data transfer system according to the present invention.

The above description shows examples in which only one optical disk device 21 is connected to the host personal computer 11 and in which one sending side data transfer device 51 and one receiving side data transfer device 61 are connected each other, but the invention is not limited thereto. For example, as shown in FIG. 4, two or more drive devices, for example, a DVD-ROM drive 21' and a CD-R/RW drive 21", may be connected to the host personal computer 11. If this is the case, the function of switching transfer rates as described above may be provided for either one of the drive devices or both of the drive devices. It is also possible to prevent a decrease in the transfer rate of the data or the like that is transferred from the host personal computer 11 to a storage medium by providing the function of switching transfer rates for the host personal computer 11. Furthermore, the present invention is not limited for the data transfer between a host personal computer and a drive device, but can be applied to data transfer between various data transfer devices in which the transfer rate can be changed.

The above-described example uses the effective data transfer rate obtained by dividing a transferred byte count by a transfer time, but this is for illustrative purposes only. It is also possible to obtain the effective data transfer rate by dividing (a data block count of the data that have been successfully transferred×a data block length) by a transfer time. In addition, various converted values by which an equivalent judgment is theoretically possible may be used, such as the ratio between the byte count or the block count of the data that have been transferred successfully and the byte count or the block count of the data that have not been transferred successfully, the ratio between either one of the foregoing bite or block counts and the byte or block count of all the transferred data, and so forth. If this is the case, it is not essential to provide the transfer time-measuring section 25.

The switching of transfer rates needs not be performed such that the transfer rate is switched one step by one step as described above, but it may be switched to two or more steps higher or lower. For example, the transfer rate may be switched to the highest possible transfer rate when a faster transfer rate is attempted. In addition, the interface between the devices, the transfer protocol, and the maximum transfer rate are not limited to the IDE bus, Ultra DMA, and transfer mode 4, respectively.

Furthermore, the device that outputs a strobe signal is not limited to the sending side device. It is possible that the receiving side device has a function of outputting a strobe signal and a function of controlling at least a transfer rate (the frequency of the strobe signal), as is the case with the optical disk device 21 shown in FIG. 1, and that the sending side device outputs data to be transferred according to the strobe signal.

Moreover, it is possible that, if both the sending and receiving devices have a function of outputting a strobe signal, sending and receiving of a command or the like is performed to confirm which of the devices has a function of detecting an effective data transfer rate and a function of controlling a transfer rate and to let the device having the functions output a strobe signal.

Further, if the data transfer rate between the sending side device and the receiving side device can be changed even after the start of the data transfer by sending and receiving a command or the like, the detection of the effective data transfer rate may be performed by either of the devices to control data transfer rates as described above.

The judgment of whether data transfer has been performed successfully or not is not limited to the above description, in which the sending side device performs the judgment based on CRC data returned from the receiving side device. It is also possible to include the CRC data or the like in the data to be transferred so that the receiving side device can judge whether data transfer has been performed successfully or not and return to the sending side the result of the judgment or the like as well as the amount of data that have been transferred successfully or the amount of data that have not been transferred successfully.

In addition, in cases where the probability of occurrence of data corruption fluctuates, it is preferable that the above-described detection of effective data transfer rates and the switching be performed continuously. However, in cases where the probability of occurrence of data corruption is considered to be constant, it is possible that the detection of the effective data transfer rate and the switching be performed only at the time of initial transfer, that is, only during the period from the start up of the transfer device or the start of the data transfer until a predetermined amount of data have been transferred or until a read command is issued a predetermined number of times, and thereafter the switched data transfer rate be maintained. In this case, during the transfer subsequent to this, the measurement of the transfer time and so forth are not carried out, and therefore, the load of the transfer processing and power consumption can be somewhat reduced.

As has been described thus far, by controlling a data transfer rate while detecting an effective data transfer rate, an appropriate data transfer rate can be selected even when data corruption occurs at high data transfer rates, and therefore, a large decrease in the data transfer rate can be prevented.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A data transfer device performing data transfer with another device, comprising:
   a transfer rate detector for detecting an effective data transfer rate based on an actual data transfer performed between the data transfer device and the another device; and
   a transfer rate controller for controlling a data transfer rate in a stepwise manner according to the result of the detection of the effective data transfer rate performed by the transfer rate detector, wherein
   at predetermined timing, the transfer rate controller selects a data transfer rate that is one step greater than a currently-selected data transfer rate,
   if the effective data transfer rate that is detected by the transfer rate detector is lower than the original data transfer rate while the data transfer rate that is one step greater is being selected, then the transfer rate controller reverts the data transfer rate to the original data transfer rate, and if the effective data transfer rate detected by the transfer rate detector is greater than the original data transfer rate, then the transfer rate controller maintains the data transfer rate that is one step greater.

2. The data transfer device according to claim 1, further comprising:

a transmitter for sending transfer data at the data transfer rate controlled by the transfer rate controller.

3. The data transfer device according to claim 2, wherein the transfer rate detector detects the effective data transfer rate based on information comprising at least one of information acknowledging that a predetermined unit amount of data blocks have been received successfully by the another device, information indicating the amount of data that have been received successfully, information indicating the amount of data that have not been received successfully, and information obtained from received data that have been subjected to a predetermined computation for detecting an error.

4. The data transfer device according to claim 2, wherein:

the transmitter outputs, in addition to the transfer data, a timing signal indicating timing for letting the another device receive the transfer data; and the transfer rate controller controls timing for outputting the transfer data and the timing signal.

5. The data transfer device according to claim 1, further comprising:

a receiver for receiving transferred data sent from the another device; and an output device for outputting a timing signal to the another device, the timing signal indicating timing for the another device to send the transferred data;

wherein:

the transfer rate controller controls output timing of the timing signal.

6. The data transfer device according to claim 1, wherein the transfer rate detector detects the effective data transfer rate based on a total time in which data transfer has actually been performed and an amount of data that has been transferred successfully.

7. The data transfer device according to claim 1, wherein the transfer rate detector detects the effective data transfer rate according to a frequency of data transfer in which the data transfer has been performed successfully.

8. The data transfer device according to claim 1, wherein, when the effective data transfer rate that has been detected by the transfer rate detector is lower than a transfer rate that is one step lower than a currently-selected data transfer rate, the transfer rate controller selects the data transfer rate that is one step lower.

* * * * *